(12) United States Patent
Hartl et al.

(10) Patent No.: US 11,300,117 B2
(45) Date of Patent: Apr. 12, 2022

(54) AIR SUPPLY SYSTEM WITH ELECTRONIC CONVERTER

(71) Applicant: KNORR-BREMSE SYSTEME FÜR SCHIENENFAHRZEUGE GMBH, Munich (DE)

(72) Inventors: Michael Hartl, Unterhaching (DE); Martin Linner, Schwindegg (DE); Gert Assmann, Munich (DE); Thomas Merkel, Hürth (DE)

(73) Assignee: KNORR-BREMSE SYSTEME FÜR SCHIENENFAHRZEUGE GMBH, Munich (DE)

( * ) Notice: Subject to any disclaimer, the term of this patent is extended or adjusted under 35 U.S.C. 154(b) by 709 days.

(21) Appl. No.: 14/765,195

(22) PCT Filed: Feb. 11, 2014

(86) PCT No.: PCT/EP2014/052599
§ 371 (c)(1),
(2) Date: Jul. 31, 2015

(87) PCT Pub. No.: WO2014/124920
PCT Pub. Date: Aug. 21, 2014

(65) Prior Publication Data
US 2015/0369235 A1 Dec. 24, 2015

(30) Foreign Application Priority Data

Feb. 14, 2013 (DE) ...................... 10 2013 101 502.6

(51) Int. Cl.
F04B 49/06 (2006.01)
B60T 17/02 (2006.01)
(Continued)

(52) U.S. Cl.
CPC ............ *F04B 49/06* (2013.01); *B60T 17/002* (2013.01); *B60T 17/004* (2013.01); *B60T 17/02* (2013.01);
(Continued)

(58) Field of Classification Search
CPC .......... F04B 23/00; F04B 23/02; F04B 35/04; F04B 49/06; F04B 49/065; F04B 2201/08;
(Continued)

(56) References Cited

U.S. PATENT DOCUMENTS 7,260,949 B2 * 8/2007 King .................... B01D 53/265
236/44 C
2003/0156954 A1 8/2003 Kimura et al.
(Continued)

FOREIGN PATENT DOCUMENTS

CN 85109036 A 8/1986
CN 1181043 A 5/1998
(Continued)

OTHER PUBLICATIONS

Search Report for International Patent Application No. PCT/EP2014/052599; dated Jul. 17, 2014.
(Continued)

Primary Examiner — Dominick L Plakkoottam
Assistant Examiner — Charles W Nichols
(74) Attorney, Agent, or Firm — Barnes & Thornburg LLP

(57) ABSTRACT

An air supply system having a compressor driven by a motor for producing compressed air, an air drier system for extracting moisture from the compressed air produced, an electronic converter for demand-dependent control of the compressor and analog and/or digital sensors for producing electrical signals, the electrical signals being useful for
(Continued)

controlling the electronic converter and for monitoring and controlling the compressor. The electrical signals produced by the sensors are converted in the electronic converter to bus signals that can be provided for evaluation at a bus interface.

16 Claims, 1 Drawing Sheet

(51) Int. Cl.
    *B60T 17/00*     (2006.01)
    *F04B 25/00*     (2006.01)
    *F04B 35/04*     (2006.01)
    *F04C 18/16*     (2006.01)
    *F04C 29/00*     (2006.01)
    *F04C 28/00*     (2006.01)

(52) U.S. Cl.
    CPC .............. *F04B 25/00* (2013.01); *F04B 35/04* (2013.01); *F04C 18/16* (2013.01); *F04C 28/00* (2013.01); *F04C 29/0085* (2013.01)

(58) Field of Classification Search
    CPC ...... F04B 2203/0204; F04B 2203/0404; F04C 18/16; F04C 28/00; F04C 28/08; F04C 29/0085; F04C 2270/09; F04C 2270/095; F04D 25/06; F04D 26/068; F04D 29/40; B60T 17/002; B60T 17/02; B60T 17/004
    See application file for complete search history.

(56) References Cited

U.S. PATENT DOCUMENTS

| | | | | |
|---|---|---|---|---|
| 2005/0198981 | A1* | 9/2005 | Arno | F25B 49/025 62/229 |
| 2006/0275143 | A1* | 12/2006 | Jayanth | G01L 19/003 417/63 |
| 2008/0276604 | A1* | 11/2008 | Hosaka | F01N 9/002 60/295 |
| 2008/0288115 | A1* | 11/2008 | Rusnak | F04D 15/0066 700/282 |
| 2009/0254246 | A1* | 10/2009 | Yang | B60T 17/02 701/36 |
| 2012/0210742 | A1* | 8/2012 | Kato | F25B 13/00 62/159 |
| 2013/0120052 | A1* | 5/2013 | Siska | H03K 17/962 327/517 |
| 2013/0294938 | A1* | 11/2013 | Worden | F04B 25/00 417/53 |
| 2013/0306300 | A1* | 11/2013 | Welsch | F01P 7/048 165/287 |

FOREIGN PATENT DOCUMENTS

| | | |
|---|---|---|
| CN | 101725515 A | 6/2010 |
| CN | 102588259 A | 7/2012 |
| DE | 102007056318 A1 | 10/2008 |
| DE | 102009050720 A1 | 4/2011 |
| DE | 102009052510 A1 | 5/2011 |
| DE | 102010020266 A1 | 11/2011 |
| EP | 0872342 A2 | 10/1998 |
| EP | 0976635 A2 | 2/2000 |
| EP | 1993893 A1 | 11/2008 |
| EP | 2388172 A1 | 11/2011 |
| EP | 2553537 A1 | 2/2013 |
| JP | H01292710 A | 11/1989 |
| JP | H08219058 A | 8/1996 |
| JP | H11504294 A | 4/1999 |
| JP | 2003239862 A | 8/2003 |
| JP | 2009527683 A | 7/2009 |
| JP | 2009197701 A | 9/2009 |
| JP | 2010124691 A | 6/2010 |
| KR | 19980018326 A | 6/1998 |
| KR | 20080110945 A | 12/2008 |
| WO | WO-2012086089 A1 * | 6/2012 ................ F25B 1/02 |

OTHER PUBLICATIONS

Chinese Office Action corresponding to 2014 80008877.3 dated Oct. 8, 2016.
German Office Action corresponding to 10 2013 101 502.6 dated Oct. 23, 2017.
Kaeser Kompressoren Gmbh, "InterneKompressor-Steuerung Sigma Control 2" Prospekt Kaeser Kompressoren Gmbh, Okt. 1, 2010.
BITZER KOhlmaschinenbau GmbH, "Intelligente Verdichter" Prospekt BITZER KOhlmaschinen GmbH, Mar. 1, 2012.
Korean Office Action corresponding to KR 10-2015-7023784 dated Jan. 13, 2020.

* cited by examiner

AIR SUPPLY SYSTEM WITH ELECTRONIC CONVERTER

PRIORITY CLAIM

This patent application is a U.S. National Phase of International Patent Application No. PCT/EP2014/052599, filed 11 Feb. 2014, which claims priority to German Patent Application No. 10 2013 101 502.6, filed 14 Feb. 2013, the disclosures of which are incorporated herein by reference in their entirety.

FIELD

Disclosed embodiments provide an air supply system comprising a compressor driven by a motor for producing compressed air, an air drier system for extracting moisture from the produced compressed air, an electronic converter for demand-dependent compressor control and a plurality of analogue and/or digital sensors for generating electrical signals.

Disclosed embodiments extend primarily to rail vehicles, whose compressed air supply system is primarily used for the provision of a brake pressure for the vehicle brakes. However, it is also conceivable to dispose the air supply system in commercial vehicles of all types to operate a pneumatic circuit therein.

BRIEF DESCRIPTION OF THE FIGURES

Disclosed embodiments are described in detail below using the figures. In the figures.

DETAILED DESCRIPTION OF THE DISCLOSED EMBODIMENTS

Figure 1:
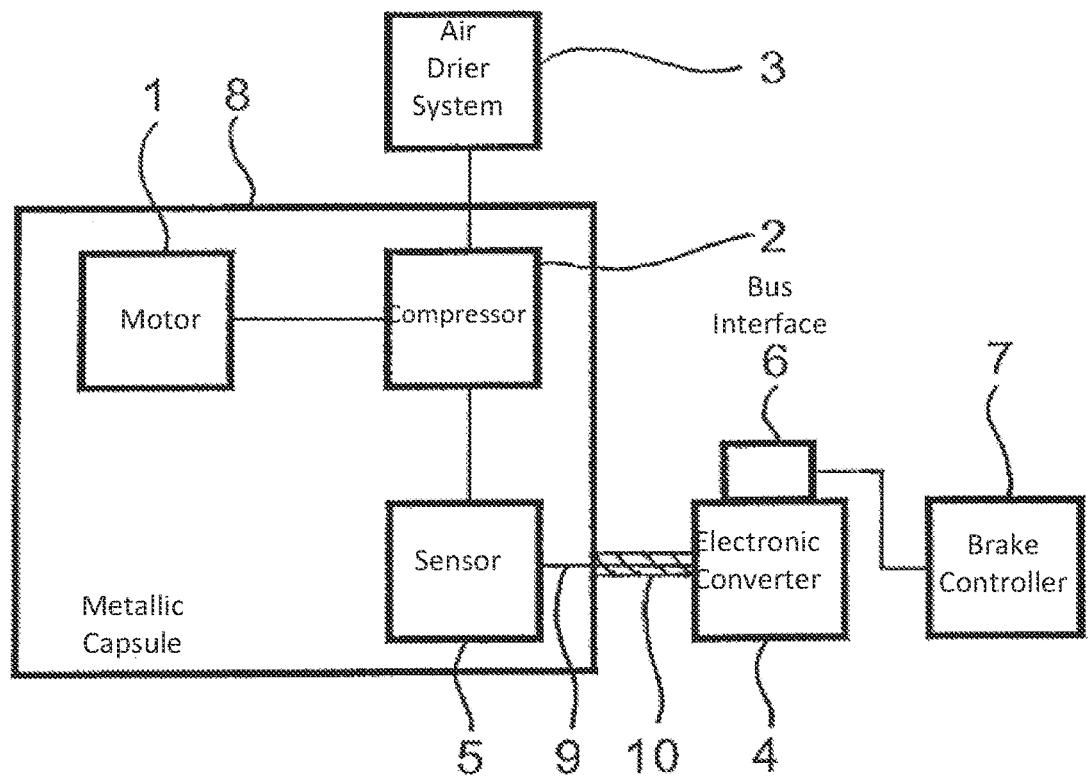
FIG. 1 shows a simplified block diagram of an air drier system with a metallic capsule.

Disclosed embodiments provide an air supply system that controls the revolution rate of the compressor depending on demand, but that also processes signals for the diagnosis of the compressor.

The electrical signals can be used for control of the electronic converter and for monitoring and controlling the compressor, wherein processing the electrical signals generated by the sensor into bus signals that can be provided for evaluation at a bus interface is carried out in the electronic converter. The electronic converter may process the electrical signals into a CAN bus signal. Separate controllers for electronic monitoring of the compressor and of the motor can be saved. Moreover, the option is provided to intelligently couple diagnostic signals of the compressor controller with other diagnostic and control signals of the converter, to further process the same and to establish advantageous operating states by communications among the controllers for the compressor and/or the air supply system.

Disclosed embodiments include the technical feature that the electronic converter is a frequency converter with a memory programmable controller. By means of the integrated memory programmable controller, a user-defined control program can be implemented in the electronic converter. The program reads in the signals at analogue and digital inputs, processes the same further and regulates the output frequency depending on the programming. The electronic converter may have eight analogue inputs available for processing the sensor signals for monitoring the compressor.

According to an exemplary embodiment, the software comprising control commands for detecting limit values and generating warning signals is stored in a central brake controller. In at least one version, a master function is implemented directly by the central brake controller. This eliminates the development of compressor-specific evaluation hardware. A program for limit value detection computation and warning signal generation with evaluation software may be stored in a bus master.

According to a further exemplary embodiment, the software comprising control commands for detecting limit values and generating warning signals is implemented in the memory programmable controller of the electronic converter. The advantage of the implementation with a converter is a reduction of the load on the computing power of a master (BSG), as the same only forwards the signals and a calculation is thus eliminated.

The compressor may be a two-stage oil-free or oil-lubricated piston compressor. A single-stage oil-free or oil-lubricated piston compressor is also conceivable. The monitoring of the compressor consists in the case of two-stage oil-free piston compressors of sensors that monitor in particular at least one cylinder wall temperature, a cooling air temperature, an induction temperature and pressures, such as an end pressure, an intermediate pressure and a negative pressure at the induction filter. In the case of oil-lubricated compressors, by contrast it is also useful to monitor in particular an oil temperature and an air outlet temperature.

Moreover, the compressor may be a rotation compressor. The compressor may be a single-stage screw-type compressor.

The electronic converter may be directly mounted on the motor. A compact design can be achieved as a result.

According to an exemplary embodiment, the motor and the compressor are disposed in a metallic capsule, wherein sensor lines disposed between the metallic capsule and the electronic converter and thus running outside the metallic capsule have screening for shielding against electromagnetic interference. An electronic converter produces design-dependent electromagnetic interference. This can lead to interference in the sensor lines of the diagnostic signals and can cause incorrect signals. The shielded sensor lines are attached to the metallic capsule, optionally by means of connectors. Within the metallic capsule the cables are led unshielded, because the capsule itself acts as screening. Depending on the available installation space, it is also conceivable to dispose the converter within the capsule.

The sensor lines may consist of single strands with screening. Sensor signals are fed with shielding from the metallic capsule to converter. When using a multi-wire shielded cable, the screening cannot be led up to the connector strip in the electronic converter. It has proved to be particularly advantageous to feed each individual sensor signal to a housing of the electronic converter by means of a cable, optionally through common screw connectors.

Moreover, the motor may be a phase motor. Phase motors have a smaller structure size compared to d.c. motors and thus a higher power density. Moreover, phase motors operate with low wear because there is no brush wear. Moreover, electric motors have low sound emissions during operation.

According to FIG. 1, an air supply system comprises a compressor 2 powered by a motor 1. An air drier system 3 for extracting moisture from the compressed air that is produced is associated with the compressor 2. The motor 1 is a phase motor and the compressor 2 is a single-stage screw-type compressor. The air drier system 3 operates according to the absorption drying principle. Furthermore, various analogue and digital sensors 5, which receive different information and feed into in the electronic converter 4 by means of a sensor line 9, are associated with the compressor 2. The motor 1 as well as the compressor 2 and the sensors 5 are disposed within a metallic capsule 8. The sensor line 9 disposed between the sensors 5 and the electronic converter 4 comprises screening 10 between the metallic capsule 8 and the electronic converter 4. The electrical signals generated by the sensors 5 are used for controlling the electronic converter 4 and monitoring the compressor 2. Processing of the electrical signals generated by the sensors 5 to form bus signals is carried out in the electronic converter 4. The bus signals are provided to a bus interface 6 for evaluation. The software comprising control commands for detecting limit values and generating warning signals is stored in a central brake controller 7.

Figure 2:
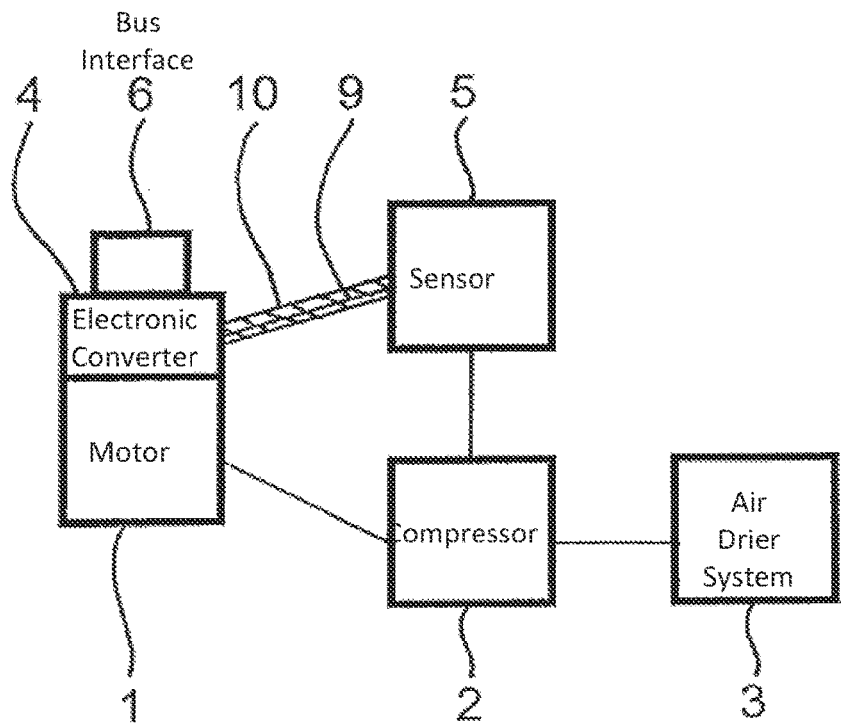
FIG. 2 shows a simplified block diagram of an air drier system with an electronic converter disposed on a motor.

A further air drier system is shown in FIG. 2, wherein the electronic converter 4 is directly mounted on the motor 1. The motor drives the compressor 2 for generating compressed air. The air drier system 3 has the task of extracting moisture from the generated compressed air. In contrast to FIG. 1, the software comprising control commands for detecting limit values and generating warning signals is implemented in the memory programmable controller of the electronic converter 4. The electrical connection between the sensors 5 and the electronic converter 4 is carried out by means of the sensor line 9 that comprises screening 10.

Variants of the disclosed embodiments are also conceivable that are also included within the protective scope of the following claims. It is thus also possible for example to design the sensor line 9 as a plurality of single strands that comprise screening 10 where necessary. Furthermore, the compressor can be a two-stage oil-free or oil-lubricated piston compressor.

In addition, it is noted that "comprising" dos not exclude any other elements or steps and "a" or "one" does not exclude any number. Furthermore, it should be noted that features or steps that have been described with reference to one of the above exemplary embodiments can also be used in combination with other features or steps of other exemplary embodiments described above. Reference characters in the claims are not to be considered as limiting.

From the generally known prior art it is apparent that compressor drives for air supply systems in rail vehicles are supplied by so-called auxiliary converters. In this case an input converter for adapting the input voltage and a number of output converters perform the adaptation to the different loads. Not only is the air supply system operated by the auxiliary converter, but also other devices such as for example equipment fans and air conditioning systems.

Separate converters that supply the drive of the compressor of the air supply system are an exception, in particular in rail vehicles. Provided that diagnostic devices are used for the compressor, the same are implemented as additional controllers independently of the converter. Moreover, converters particularly designed for rail operation are of large dimensions and as a result take up a lot of installation space with generally high weight. A trend that is permeating drive technology to an increasing extent is that each load is given its own converter. As a result, there are new options for control, wherein the equipment diagnosis and signal processing can be implemented by means of the converter using additional electronics integrated within the converter.

A compressor device of a rail vehicle results from DE 10 2009 050 720 A1, wherein the control device can be connected to the compressor device. A first detecting means is provided for detecting available recovered braking energy. Furthermore, a control means is provided for activating the compressor device depending on the braking energy detected by the first detecting means. The control means is configured such that it activates the compressor device once the first detecting means detects a specifiable amount of available braking energy. Moreover, a second detecting means is provided for the detection of the pressure in a compressed air line system of the rail vehicle. The control device achieves a reduction of the energy consumption for a compressor device of a rail vehicle.

REFERENCE CHARACTER LIST 1 motor
2 compressor
3 air drier system
4 electronic converter
5 sensor
6 bus interface
7 brake controller
8 metallic capsule
9 sensor line
10 screening

The invention claimed is:

1. An air supply system for a rail or commercial vehicle, the air supply system comprising:
   a compressor driven by a phase motor for generating compressed air and coupled to an air drier system;
   an electronic converter for demand-dependent compressor control; and
   a plurality of analogue and/or digital sensors configured to monitor at least a cylinder wall temperature, a pressure and temperature at an induction filter, a cooling air temperature, an intermediate pressure and an end pressure at the induction filter, and to produce electrical signals,
   wherein the electrical signals are processed by and control the electronic converter and are used for monitoring and controlling the compressor,
   wherein the electronic converter processes the electrical signals produced by the sensors form bus signals, which are provided to a bus interface for evaluation, and
   wherein the electronic converter is a frequency converter with an integrated memory programmable controller.

2. The air supply system of claim 1, wherein software comprising control commands for detecting limit values and generating warning signals is implemented in the memory programmable controller of the electronic converter.

3. The air supply system of claim 1, wherein the software comprising control commands for detecting limit values and generating warning signals is stored in a central brake controller.

4. The air supply system of claim 1, wherein the compressor is a two-stage oil-free or oil-lubricated piston compressor.

5. The air supply system of claim 1, wherein the compressor is a rotation compressor.

6. The air supply system of claim 1, wherein the electronic converter is directly attached on the motor.

7. The air supply system of claim 1, wherein the motor and the compressor are disposed in a metallic capsule, wherein sensor lines that are disposed between the metallic capsule and the electronic converter and run outside the metallic capsule have screening for shielding them against electromagnetic interference.

8. The air supply system of claim 7, wherein the sensor lines consist of single strands with screening.

9. The air supply system of claim 1, wherein the motor, the compressor, and the converter are disposed in a metallic capsule.

10. An air supply system for a rail or commercial vehicle, the air supply system comprising:
- a compressor driven by a phase motor for generating compressed air and coupled to an air drier system;
- an electronic converter for demand-dependent compressor control;
- a plurality of analogue and/or digital sensors configured to monitor at least a cylinder wall temperature, a pressure and temperature at an induction filter, a cooling air temperature, an intermediate pressure and an end pressure at the induction filter, and to produce electrical signals; and
- a central brake controller,
- wherein the electronic converter processes the electrical signals generated by the sensors, and monitors and controls the compressor based on the electrical signals,
- wherein the electronic converter controls a revolution rate of the compressor depending on demand and also electrical signals for the diagnosis of the compressor, and
- wherein the central brake controller detects limit values and generates warning signals based on the analysis of the electrical signals, and
- wherein the electronic converter is directly attached on the phase motor.

11. The air supply system of claim 10, wherein the compressor is a two-stage oil-free or oil-lubricated piston compressor.

12. The air supply system of claim 10, wherein the compressor is a rotation compressor.

13. The air supply system of claim 10, wherein the motor and the compressor are disposed in a metallic capsule, wherein sensor lines that are disposed between the metallic capsule and the electronic converter and run outside the metallic capsule have screening for shielding them against electromagnetic interference.

14. The air supply system of claim 13, wherein the sensor lines consist of single strands with screening.

15. The air supply system of claim 10, wherein the motor, the compressor, and the converter are disposed in a metallic capsule.

16. The air supply system of claim 10, wherein the electronic converter is a frequency converter with a memory programmable controller.

* * * * *